No. 764,189. PATENTED JULY 5, 1904.
J. F. HARDY.
ELECTRIC SWITCH.
APPLICATION FILED MAR. 4, 1903.
NO MODEL. 3 SHEETS—SHEET 1.

Witnesses: Inventor:
F. G. Hachenberg. James F. Hardy
Henry Thieme. by attorneys No. 764,189. PATENTED JULY 5, 1904.
J. F. HARDY.
ELECTRIC SWITCH.
APPLICATION FILED MAR. 4, 1903.
NO MODEL. 3 SHEETS—SHEET 2.

Witnesses:
F. G. Hachenberg.
Henry Thieme.

Inventor:
James F. Hardy
by attorneys

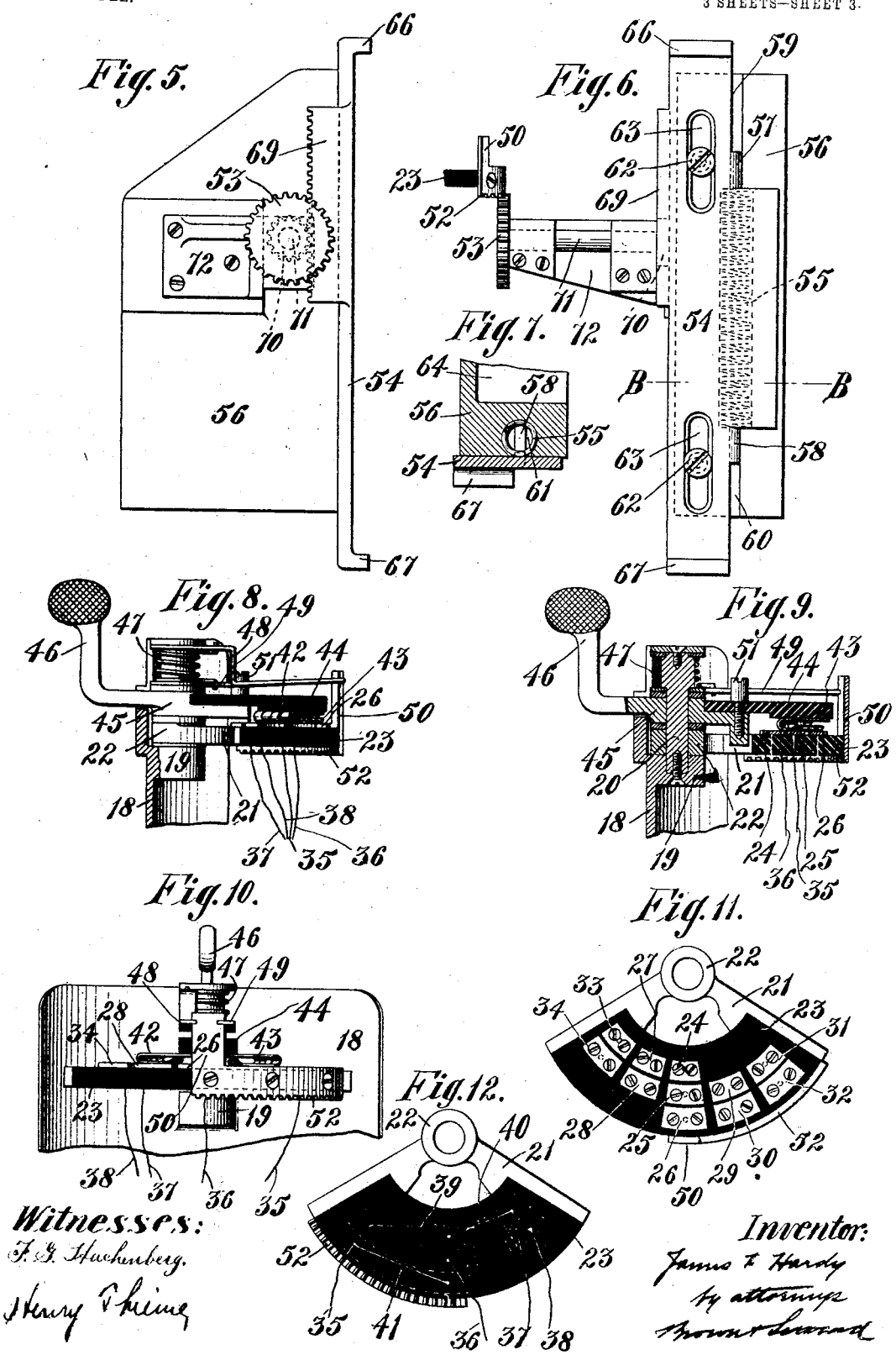

No. 764,189.

Patented July 5, 1904.

UNITED STATES PATENT OFFICE.

JAMES F. HARDY, OF NEW YORK, N. Y., ASSIGNOR TO CONSOLIDATED DENTAL MANUFACTURING COMPANY, OF NEW YORK, N. Y., A CORPORATION OF NEW YORK.

ELECTRIC SWITCH.

SPECIFICATION forming part of Letters Patent No. 764,189, dated July 5, 1904.

Application filed March 4, 1903. Serial No. 146,066. (No model.)

*To all whom it may concern:*

Be it known that I, JAMES F. HARDY, a citizen of the United States, and a resident of the borough of Manhattan, in the city and State of New York, have invented a new and useful Improvement in Electric Switches, of which the following is a specification.

My invention relates to an improvement in electric switches, and has for its object to provide a switch for controlling the movements of an electric-motor shaft which is so constructed that it will be operated by a part moved by the shaft when the part reaches a predetermined point for automatically stopping the motor-shaft.

A further object is to provide an electric switch comprising a suitable support, a switchboard pivoted, to swing on the support, and a switch-lever also pivoted to swing on the said support.

A practical embodiment of my invention is represented in the accompanying drawings, in which I have represented the switch in connection with means for raising and lowering the seat-support of a chair—such, for instance, as a surgical or dental chair.

Figure 1:
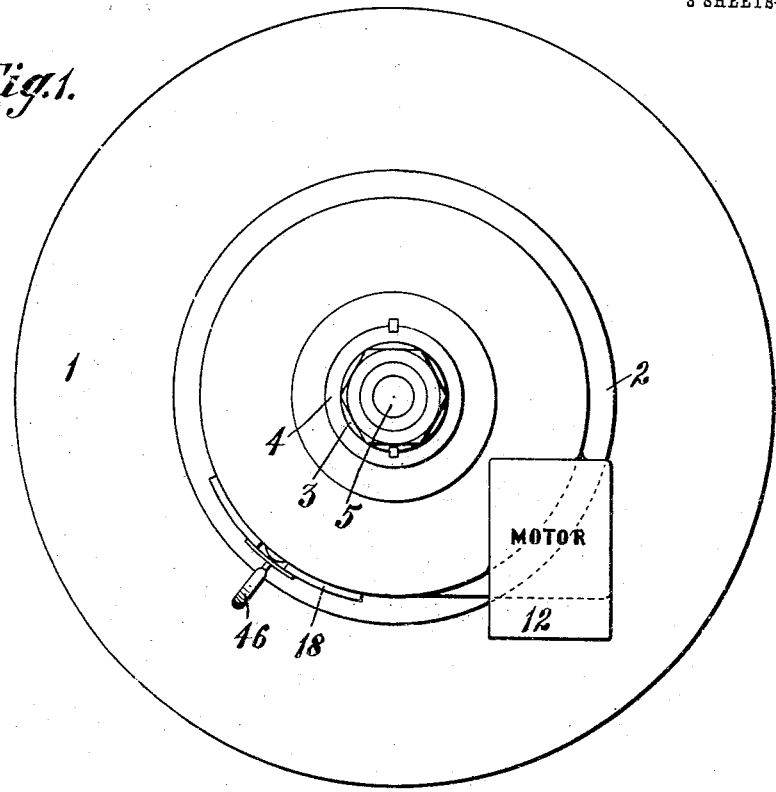
Figure 2:
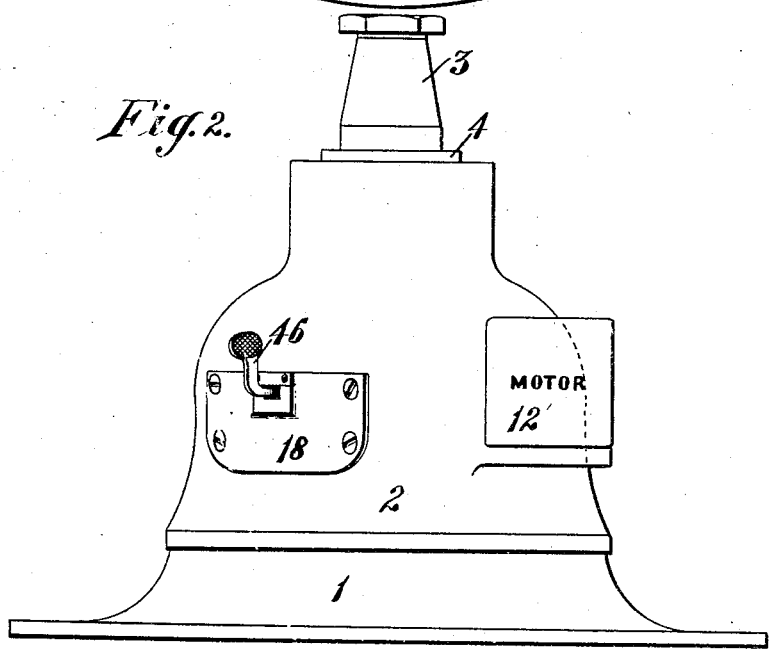
Figure 3:
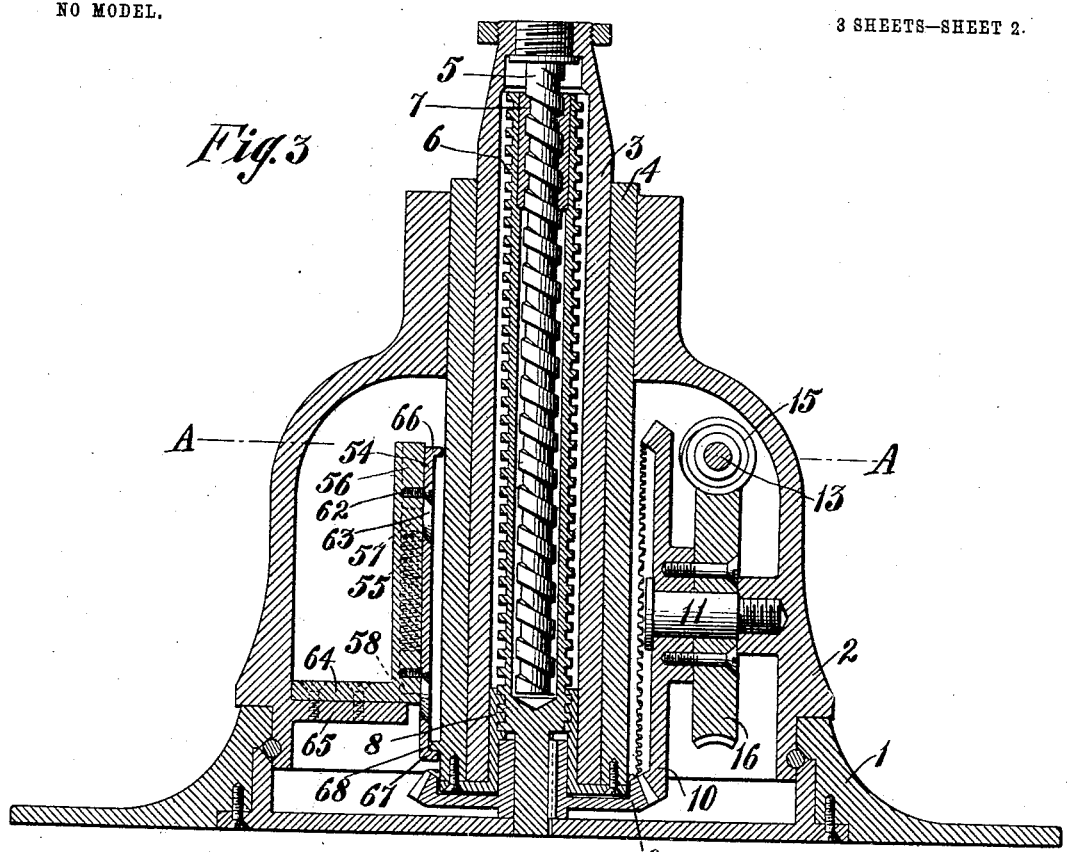
Figure 4:
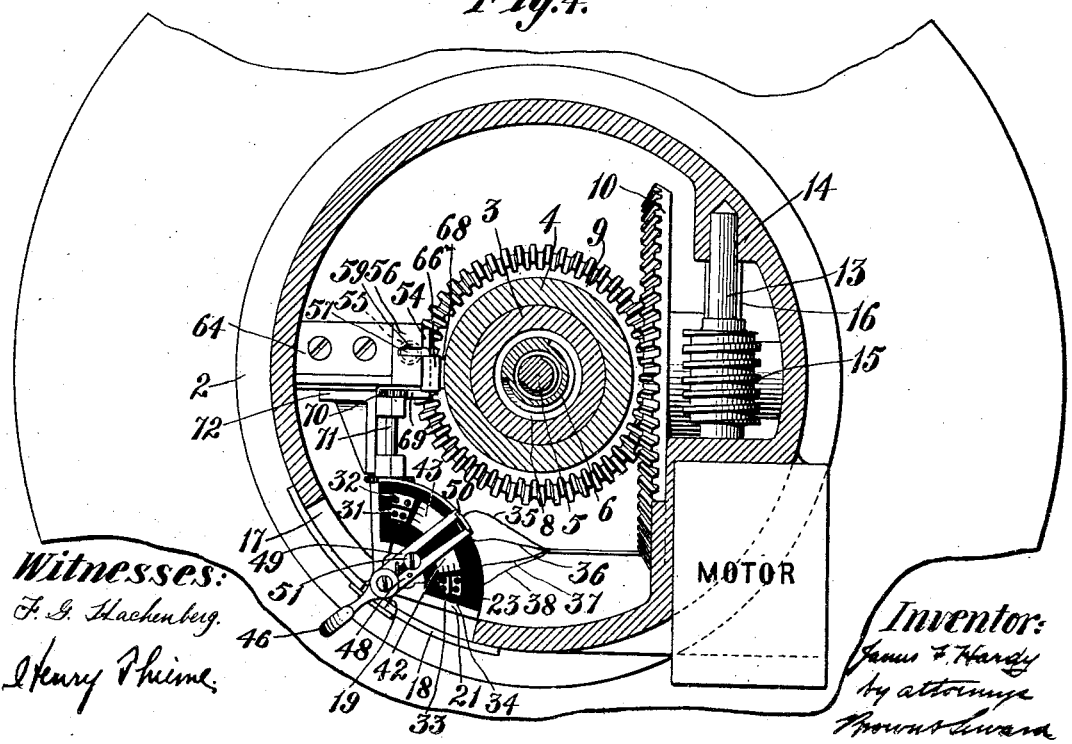

Figure 1 represents in top plan the base and seat-support of a chair, showing the position of my improved switch on the base.
Fig. 2 is a view in side elevation of the same. Fig. 3 is a vertical central section. Fig. 4 is a partial horizontal section taken in the plane of the line A A of Fig. 3. Fig. 5 is an enlarged detail view, in side elevation, of the means for automatically operating the switch when the seat-support reaches the limit of its upward or downward movement. Fig. 6 is a front view showing a fragment of the switch. Fig. 7 is a partial transverse section taken in the plane of the line B B of Fig. 6. Fig. 8 is a view in side elevation of the switch in its normal position, a portion of its support being also shown. Fig. 9 is a vertical central section through the same. Fig. 10 is a rear view. Fig. 11 is a top plan view of the rocking switchboard with the contact-plates in position thereon, and Fig. 12 is an inverted plan view of the same.

The lower or stationary section of the base of the chair is denoted by 1, and the upper section, which is mounted to rotate upon the lower section, is denoted by 2. The vertically-reciprocating seat-support is herein represented as composed of the following parts: A tubular-post 3, which is fitted to have the chair-seat (not shown herein) secured thereto, is fitted to slide vertically in a secondary tubular post 4, which post is in turn fitted to slide in the upper or rotary section 2 of the base. A stationary exteriorly-cut screw 5 is permanently secured at its upper end in the upper end of the inner tubular post 3 and projects downwardly therein to a point near the bottom of the said post. A hollow exteriorly-threaded rotary screw 6 surrounds the stationary screw 5 and has fixed thereto at its upper end an interiorly-screw-threaded nut 7, which fits the threads of the screw 5, so that when the screw 6 is rotated the screw 5, and thereby the hollow post 3, is moved up or down, according to the direction in which the screw 6 is rotated. An interiorly-screw-threaded traveling nut 8 is secured to the lower end of the tubular post 4 and engages the threads upon the screw 6, so that when the screw 6 is rotated the hollow post 4 will be moved up or down, according to the direction in which the screw is rotated.

The screws 5 and 6 are threaded in the same direction, but have different pitches for sending the two posts 3 and 4 up or down at different speeds.

A bevel-gear 9 is keyed to the lower end of the rotary screw 6, which bevel-gear intermeshes with a driving bevel-gear 10, loosely mounted upon a stud-axle 11, secured to the rotary section 2 of the base.

The means which I have shown for positively moving the seat-support up or down, as may be required, is as follows: An electric motor 12 of any suitable type is supported upon the movable section 2 of the base, so as to be free to be turned therewith into any position which it may be required to have the person in the chair occupy. The motor-shaft 13 projects into the interior of the rotary section 2 of the base across the space above the stud-axle 11, which shaft 13 preferably has its outer end mounted in suitable bearing 14 on the interior wall of the said rotary section 2. This motor-shaft 13 has a worm-and-gear connection with the bevel-gear 10 on the stud-axle as follows: A worm 15 is carried by the shaft 13, and a gear 16 is fixed to the bevel-gear 10, but loosely mounted on the stud-axle 11. The relation between the worm and gear may be such as to produce the best results in operating the motor and seat-support.

The switch which I employ for starting the motor-shaft to rotate in one or the other direction or to stop the same is constructed, arranged, and operated as follows: The wall of the rotary section 2 of the base is cut away, as shown at 17, at any suitable place in the said section for the insertion and removal of the switch. This cut-away portion is closed by means of a switch-supporting plate 18, provided with an inwardly-projected lug 19, within which lug is secured a vertical pivot-pin 20 for supporting the several parts of the switch.

The switchboard is denoted as a whole by 21, and it is preferably in the shape of a segment and is provided with a suitable hub 22, which embraces the pivot-pin 20, above referred to.

The contact-plates are arranged in the insulated portion 23 of the switchboard as follows: Three plates 24 25 26 are arranged in alinement at different distances from the axis of the board. Upon one side of these three contact-plates are located two dead-plates 27 28. Upon the other side of these three plates are located two dead-plates 29 30. Beyond the dead-plates 29 and 30 are located contact-plates 31 32, and beyond the dead-plates 27 28 are located two contact-plates 33 34. The plates 27 and 33 are located at the same distance from the pivot of the switchboard as the contact-plate 24. The plates 34, 28, 29, and 31 are located at the same distance from the pivot of the switchboard as the plate 25. The plates 30 32 are located at the same distance from the pivot as the plate 26.

The wires which connect the motor with the switchboard are denoted by 35, 36, 37, and 38. The wire 38 leads to the contact-plate 34 and from thence by a branch 39 to the contact-plate 31. The wire 37 leads to the contact-plate 33 and from thence by a branch 40 to the contact-plate 24. The wire 36 leads to the contact-plate 25. The wire 35 leads to the contact-plate 32 and from thence by a branch wire 41 to the contact-plate 26.

Two sets of brushes 42 43 project from opposite sides of the arm 44 of the switch-lever, which switch-lever is provided with a suitable hub 45, fitted to embrace the pivot-pin 20, upon which the switchboard 21 is supported.

The switch-lever is provided with an outwardly-projected arm 46, which projects through the plate 18 to the exterior of the base, whereby the switch may be moved by the foot of the operator to swing the brushes into position to drive the motor in one direction or the other, as may be desired.

The brushes 42 are so arranged that they will travel over the pairs of contact-plates 33 34, 27 28, and 24 25. The brushes 43 are fitted to travel over the contact-plates 31 31, 29 30, and 25 26.

The switch-lever is held normally in its intermediate position by means of a double-acting spring 47 as follows: This spring 47 is coiled around the upper end of the pin 20 above the switchboard and lever, and the ends of the spring are engaged with arms 48 49, pivoted on the pivot-pin 20.

The tendency of the spring is to swing these arms toward each other, and they are held at the limit of this movement by means of a stop 50, projecting upwardly from the switchboard, and a stop 51, projecting upwardly from the switch-lever.

The switchboard is normally held against movement on its pivot-pin 20 by means of curved rack 52, which engages a pinion 53, which pinion is only rotated at predetermined times, as will be hereinafter fully set forth.

As the switch-lever is swung in one direction the stop 51 will engage one of the arms 48 49 and swing it away from its normal position against the tension of the spring 47, so that when the switch-lever is released it will be automatically thrown back into its intermediate position with both brushes out of contact.

As the switch-lever is swung in one direction it will cause the motor to raise the seat-support, and when the switch-lever is swung in the opposite direction it will first stop the motor and then reverse it to cause the motor to drive the seat-support in the opposite direction.

To prevent accidents owing to the switch-lever being held too long in position to operate the motor in one direction, I provide means for automaticaly shifting the switchboard to stop the motor when the seat-support reaches the limit of its upward or downward movement, which means is constructed, arranged, and operated as follows: A vertically-sliding spring-actuated plate 54 is yieldingly held intermediate the limits of its movements by means of a coil-spring 55, located in the plate-support 56, the ends of which springs press against upper and lower inwardly-turned ears 57 58 of the plate, which ears are fitted to slide in vertical grooves 59 60, opening into the socket 61, in which the spring 55 is located. The plate 54 is held on its support by means of pin-and-slot connections 62 63.

The support 56 is secured to the interior of the rotary section 2 of the base, preferably by providing the support with a flange 64 and the section 2 with a flange 65, upon which the flange 64 rests.

The plate 54 is provided with upper and lower lips 66 67, which are arranged to be successively engaged by an abutment 68 on the tubular post 4 as the seat-support nears the limit of its upward and downward movements. The further movement of the seat-support in these directions will impart a slight sliding movement to the plate 54.

The plate 54 is provided with a rack 69, which engages a pinion 70, fixed to a horizontal shaft 71, mounted in suitable bearings in a bracket 72, projecting from the side of the plate-support 56.

The pinion 53 hereinabove referred to is fixed to the shaft 71 so that any movement imparted to the pinion 70 by the sliding movement of the plate 54 will impart a corresponding movement to the pinion 53, and thereby rock the switchboard 21 a sufficient distance to break the connection through the switch-lever and stop the motor.

Supposing it be desired to raise the chair-support, the switch-lever is rocked to cause the motor-shaft to rotate in a direction to raise the said seat-support. As the seat-support reaches the limit of its upward movement it will raise the sliding plate 54, and thus swing the switchboard 21 into a position which will cut off the current from the motor, and thereby stop the motor.

The operator may stop the motor at any time intermediate the limits of the movements of the seat-support by manipulating the switch-lever.

Supposing the seat-support to be at the limit of its upward movement and it be desired to lower the same, the switch-lever is rocked in a direction tending to rotate the motor-shaft in a reverse direction. As the seat-support descends its abutment 68 will engage the lip 67 on the sliding plate 54 and depress the same, thus swinging the switchboard 21 into a position to cut off the current and stop the motor. It will thus be seen that the motor is automatically stopped when the seat-support reaches the limit of its upward or downward movement, and at the same time the operator is permitted to have full control of the motor when the seat-support is at the points intermediate the limits of its movements.

While I have shown and described my improved electric switch in connection with a chair raising and lowering mechanism, it is to be understood that I do not limit myself to its use in such connection, for it is evident that the switch may be used in many different places where it is desirable that the movement of a part should be automatically stopped when the part reaches a predetermined point. Hence I do not wish to limit myself to the use of the switch in connection with a chair raising and lowering mechanism.

What I claim is—

1. An electric switch comprising a suitable support, a switch-lever and switchboard fitted to swing on the said support and spring-actuated arms engaging the lever and board and arranged to yieldingly keep the lever and board to their normal position with respect to each other.

2. In combination, a movable part, an electric motor for operating the same, a switch for controlling the motor and means for operating the switch to stop the motor when the movable part reaches a predetermined point comprising a sliding plate having lips thereon near the limits of the sliding movement of the movable part, an abutment on the movable part fitted to engage one or the other of the said lips as the movable part nears the limit of its sliding movement and a connection between the sliding plate and the switch whereby the movement of the plate is imparted to the switch.

3. In combination, a movable part, an electric motor for operating the same, a switch for controlling the motor and means for operating the switch to stop the motor comprising a sliding plate arranged to be engaged by the movable part when the part reaches a predetermined point and a connection between the plate and switch comprising a cross-shaft having a pinion-and-rack engagement with the switch and sliding plate whereby the movement of the plate is imparted to the switch.

4. In combination, a movable part, an electric motor for operating the same, a switch for controlling the motor and means for operating the switch to stop the motor comprising a sliding plate, a spring for holding the plate intermediate the limits of its sliding movement, an abutment carried by the movable part for engaging the sliding plate as the movable part reaches a predetermined point and a connection between the sliding plate and switch whereby the movement of the plate is imparted to the switch.

5. In combination, a movable part, a motor for operating the same, a switch for controlling the motor and means controlled by the movable part for operating the switch comprising a sliding plate connected to the switch and having inwardly-turned ears, a plate-support having grooves in which the ears are fitted to travel and a spring in the plate-support fitted to engage the said ears for holding the sliding plate intermediate the limits of its sliding movement.

6. An electric switch comprising a suitable support, a switch-lever and switchboard fitted to swing thereon, stops carried by the switch-lever and switchboard and spring-actuated arms arranged to engage the said stops for returning the switch-lever and switchboard to their normal position with respect to each other when the parts are released.

7. A chair comprising a vertically-reciprocating seat-support, an electric motor for operating the same, a switch for the motor and means for operating the switch to stop the motor comprising a vertically-sliding plate having upper and lower lips, an abutment on the seat-support fitted to engage said lips for sliding the plate and a connection between the plate and the switch whereby the movement of the plate is imparted to the switch.

8. A chair comprising a vertically-reciprocating seat-support, an electric motor for operating the same, a switch for controlling the motor and means for operating the switch to stop the motor when the seat-support reaches a predetermined point comprising a vertically-sliding plate having lips thereon, a spring for holding the plate intermediate the limits of its movement, an abutment on the seat-support fitted to engage the said lips for sliding the plate and a connection between the plate and the switch whereby the movement of the plate is imparted to the switch.

9. A chair comprising a vertically-reciprocating seat-support, an electric motor for operating the same, a switch for controlling the motor and means for operating the switch to stop the motor comprising a vertically-sliding plate having lips thereon, an abutment on the seat-support fitted to engage said lips to slide the plate and a cross-shaft having a pinion-and-rack engagement with the switch and the sliding plate whereby the movement of the plate is imparted to the switch.

In testimony that I claim the foregoing as my invention I have signed my name, in presence of two witnesses, this 25th day of February, 1903.

JAMES F. HARDY.

Witnesses:
FREDK. HAYNES,
HENRY THIEME.